US011077396B2

(12) United States Patent
Yang et al.

(10) Patent No.: US 11,077,396 B2
(45) Date of Patent: Aug. 3, 2021

(54) VENTILATING DEVICE

(71) Applicants: Panasonic Ecology Systems Guangdong Co., Ltd., Guangdong (CN); Panasonic Corporation, Osaka (JP)

(72) Inventors: Decong Yang, Guangdong (CN); Guofeng Pang, Guangdong (CN); Runxin Chen, Guangdong (CN); Naoyuki Funada, Aichi (JP)

(73) Assignees: Panasonic Ecology Systems Guangdong Co., Ltd., Guangdong (CN); Panasonic Corporation, Osaka (JP)

( * ) Notice: Subject to any disclaimer, the term of this patent is extended or adjusted under 35 U.S.C. 154(b) by 204 days.

(21) Appl. No.: 16/142,169

(22) Filed: Sep. 26, 2018

(65) Prior Publication Data

US 2019/0160412 A1    May 30, 2019

(30) Foreign Application Priority Data

Nov. 27, 2017  (CN) .......................... 201721611219.0

(51) Int. Cl.
*F24F 13/20*    (2006.01)
*F24F 11/00*    (2018.01)
(Continued)

(52) U.S. Cl.
CPC ..... *B01D 46/0086* (2013.01); *B01D 46/0043* (2013.01); *B01D 46/0045* (2013.01);
(Continued)

(58) Field of Classification Search
CPC .............. A61M 16/021; A61M 16/022; A61M 16/024; A61M 16/026; A61M 16/0057; A61M 16/0063; A61M 16/0066; F24F 11/0001; F24F 11/0002; F24F 2013/207; F24F 2203/1096; F24F 11/00;
(Continued)

(56) References Cited

U.S. PATENT DOCUMENTS

| 5,294,195 A | * | 3/1994 | Amr .......................... F24F 1/18 312/236 |
| 5,622,058 A | * | 4/1997 | Ramakrishnan ........ F24F 13/20 62/295 |

(Continued)

*Primary Examiner* — Jonathan Luke Pilcher
(74) *Attorney, Agent, or Firm* — RatnerPrestia

(57) ABSTRACT

A ventilating device including: a frame provided with an air inlet and an air outlet, an air blowing unit for directing air, a control circuit board for controlling the air blowing unit, an operation switch for adjusting a rotating speed of the air blowing unit, and a circuit board box for accommodating the control circuit board. The circuit board box includes: a first accommodating portion in which the operation switch is housed and a second accommodating portion in which the control circuit board is housed. The first accommodating portion includes: a first opening that functions as an operation port; and a panel for covering the first opening. The frame is provided with a second opening opposite to the first opening. The panel is exposed from the second opening to exterior of the frame. A sealing portion is provided around the first opening.

12 Claims, 6 Drawing Sheets

(51) Int. Cl.

| | |
|---|---|
| *B01D 46/00* | (2006.01) |
| *F24F 7/06* | (2006.01) |
| *F24F 13/02* | (2006.01) |
| *B01D 46/44* | (2006.01) |
| *F24F 13/22* | (2006.01) |
| *F24F 8/10* | (2021.01) |
| *F24F 11/39* | (2018.01) |
| *F24F 11/52* | (2018.01) |
| *F24F 13/28* | (2006.01) |
| *B01D 46/10* | (2006.01) |
| *F24F 140/30* | (2018.01) |

(52) U.S. Cl.
CPC .............. *B01D 46/44* (2013.01); *F24F 7/065* (2013.01); *F24F 8/10* (2021.01); *F24F 11/0001* (2013.01); *F24F 13/0236* (2013.01); *F24F 13/20* (2013.01); *F24F 13/22* (2013.01); *B01D 46/10* (2013.01); *B01D 2279/35* (2013.01); *F24F 11/39* (2018.01); *F24F 11/52* (2018.01); *F24F 13/28* (2013.01); *F24F 2011/0002* (2013.01); *F24F 2013/205* (2013.01); *F24F 2013/207* (2013.01); *F24F 2013/221* (2013.01); *F24F 2140/30* (2018.01)

(58) Field of Classification Search
CPC ............... F24F 11/0004; F24F 11/0005; F24F 11/0006; F24F 11/0008; F24F 11/89; F24F 11/88; F24F 11/50; F24F 11/74; F24F 1/02–04; F24F 13/20; F24F 13/22; F24F 13/28

See application file for complete search history.

(56) References Cited

U.S. PATENT DOCUMENTS

| | | | | |
|---|---|---|---|---|
| 6,009,717 | A * | 1/2000 | Hernandez | F24F 1/027 62/262 |
| 8,940,078 | B2 * | 1/2015 | Weiden | B01D 46/0086 95/23 |
| 9,516,786 | B2 * | 12/2016 | Lan | H05K 7/20163 |
| 10,274,220 | B2 * | 4/2019 | Kojima | F24F 11/79 |
| 10,330,337 | B2 * | 6/2019 | Inada | F24F 11/89 |
| 10,655,887 | B2 * | 5/2020 | Yang | F24F 7/007 |
| 10,746,434 | B2 * | 8/2020 | Kawai | G01J 5/0205 |
| 2007/0298706 | A1 * | 12/2007 | Hudon | F24F 11/74 454/256 |
| 2014/0083292 | A1 * | 3/2014 | Weiden | F24F 11/30 95/25 |
| 2015/0009626 | A1 * | 1/2015 | Lan | H05K 7/20418 361/696 |
| 2017/0248329 | A1 * | 8/2017 | Inada | F24F 1/22 |
| 2018/0259217 | A1 * | 9/2018 | Kojima | F24F 11/77 |

* cited by examiner

VENTILATING DEVICE

CROSS-REFERENCE TO RELATED APPLICATIONS

This application claims the priority benefit of the Chinese Patent Application No. 201721611219.0 filed on Nov. 27, 2017 in the State Intellectual Property Office of China and entitled with "Ventilating Device", the whole disclosure of which is incorporated herein by reference.

FIELD OF THE DISCLOSURE

The present disclosure relates to a ventilating device.

DESCRIPTION OF THE RELATED ART

In the ventilating device of the relevant art, when the outdoor cold air comes into contact with the indoor hot and humid air, an electrical function box in which an operation switch or the like is housed will be dewed. In other words, since the outdoor cold air passes through the electrical function box, the electrical function box itself is cooled. However, in order to improve the operability, it is necessary for the switch for adjusting the electrical function box to be provided on the outer peripheral side of the electrical function box, that is, on an outer surface of the electrical function box. Thus, in the electrical function box, the internal cooling of the electrical function box is transmitted to the exterior, so that the external hot and humid air is cooled, and then dew is generated on the outer peripheral side of the electrical function box. However, the resulting dew may have a harmful effect on a circuit board within the electrical function box.

In order to prevent the occurrence of dewing, the electrical function box is completely housed in a frame, and an outer surface of the frame is attached with a sponge or the like to prevent dewing from occurring due to cooling, of the hot and humid air. However, when it is required to adjust the operation switch or the like, it is necessary to disassemble a frame wall of the ventilating device before adjustment, which causes a problem of dewing.

SUMMARY

A ventilating device of the present disclosure includes: a frame forming an outer profile of the ventilating device and provided with an air inlet and an air outlet, an air blowing unit for directing air from the air inlet to the air outlet, a control circuit board for controlling operation of the air blowing unit, an operation switch for adjusting a rotating speed of the air blowing unit by the control circuit board, and a circuit board box for accommodating the control circuit board, wherein the circuit board box includes a first accommodating portion in which the operation switch is housed and a second accommodating portion in which the control circuit board is housed, wherein the first accommodating portion includes a first opening that functions as an operation port for access from exterior of the circuit board box to the operation switch and a panel for covering the first opening, wherein the frame is provided with a second opening at a position opposite to the first opening; wherein the panel is exposed from the second opening to exterior of the frame, and wherein a sealing portion is provided around the first opening.

DETAILED DESCRIPTION OF EMBODIMENTS

To make the objectives, technical solutions, and advantages of the present disclosure more explicit and comprehensible, the present disclosure will be further described as follows in detail with reference to specific embodiments and with reference to the accompanying drawings.

In some embodiments of the present disclosure, the first accommodating portion protrudes in a direction toward the second accommodating portion from a plane in which the first opening is located.

In some embodiments of the present disclosure, the first accommodating portion includes: a first face provided with the operation port, a second face adjacent to the first face, and a third face opposite to the first surface; and the second accommodating portion is formed between the second face and an inner wall of the circuit board box and between the third face and the inner wall of the circuit board box.

In some embodiments of the present disclosure, the sealing portion includes: an annular first rib extending from the panel in a direction toward the first accommodating portion on a periphery of an inner surface of the panel facing a first accommodating portion side, and an annular second rib arranged on an edge portion of the first opening opposite to the periphery of the panel and extending from the first accommodating portion in a direction toward the panel.

In some embodiments of the present disclosure, the circuit board box includes a water directing rib surrounding the panel.

In some embodiments of the present disclosure, at least one surface of the water directing rib is a curved surface and extends to a position higher than a surface of the panel.

In some embodiments of the present disclosure, a plate-like baffle is disposed to extend on the circuit board box and configured to suppresses air indrawn from the air inlet from hitting a wall surface of the circuit board box.

In some embodiments of the present disclosure, the air blowing unit has an air intake port configured to suck the air indrawn from the air inlet into the air blowing unit, and the circuit board box constitutes a wall of a part of an air passage communicating the air inlet with the air outlet, the baffle including an inclined surface configured to direct the air indrawn from the air inlet to the air blowing unit disposed at a downstream side.

In some embodiments of the present disclosure, interior of the first accommodating portion is visible from exterior of the frame through the first opening.

In some embodiments of the present disclosure, an indicator lamp is provided in the first accommodating portion and configured to indicate a replacement for a filtering screen unit provided at a downstream side of the air inlet.

In some embodiments of the present disclosure, the control circuit board is configured to calculate the rotating speed based on a total amount of the air passing through the air blowing unit, and the indicator lamp is turned on or off if the total amount exceeds a threshold value.

Figure 1:
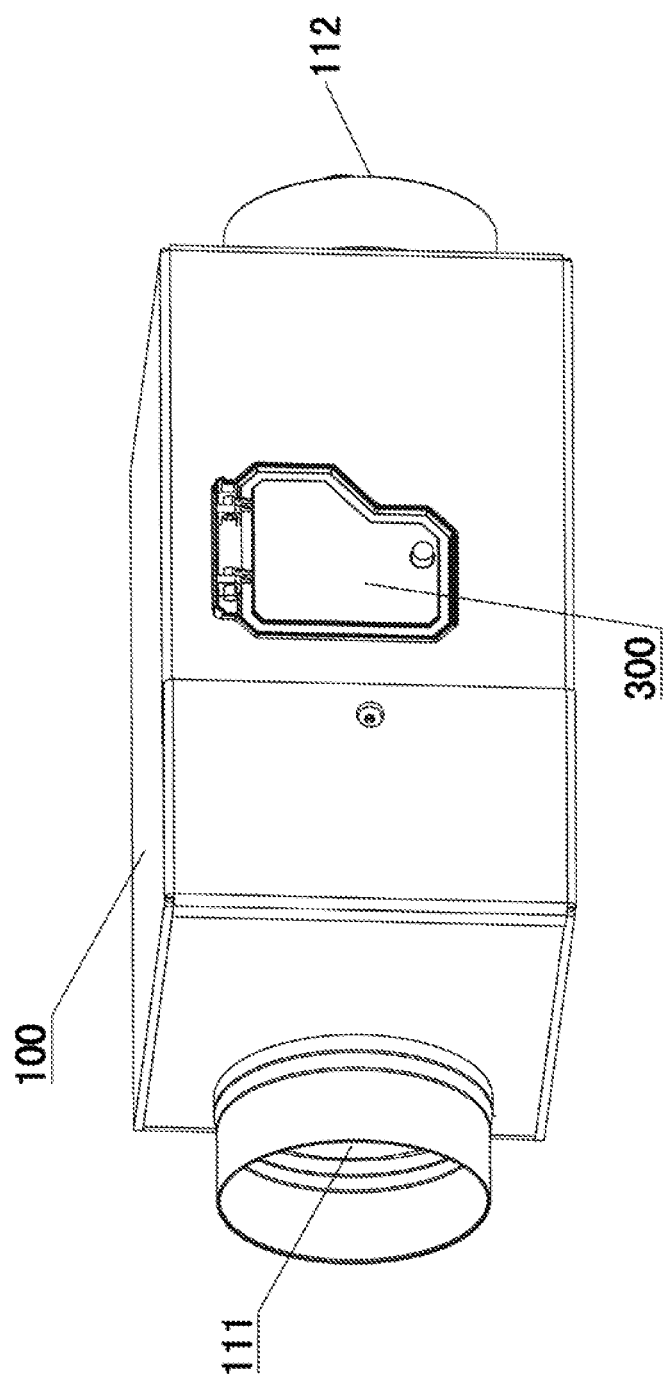
FIG. 1 is an overall schematic view of a ventilating device in accordance with an embodiment of the present disclosure.
Figure 2:
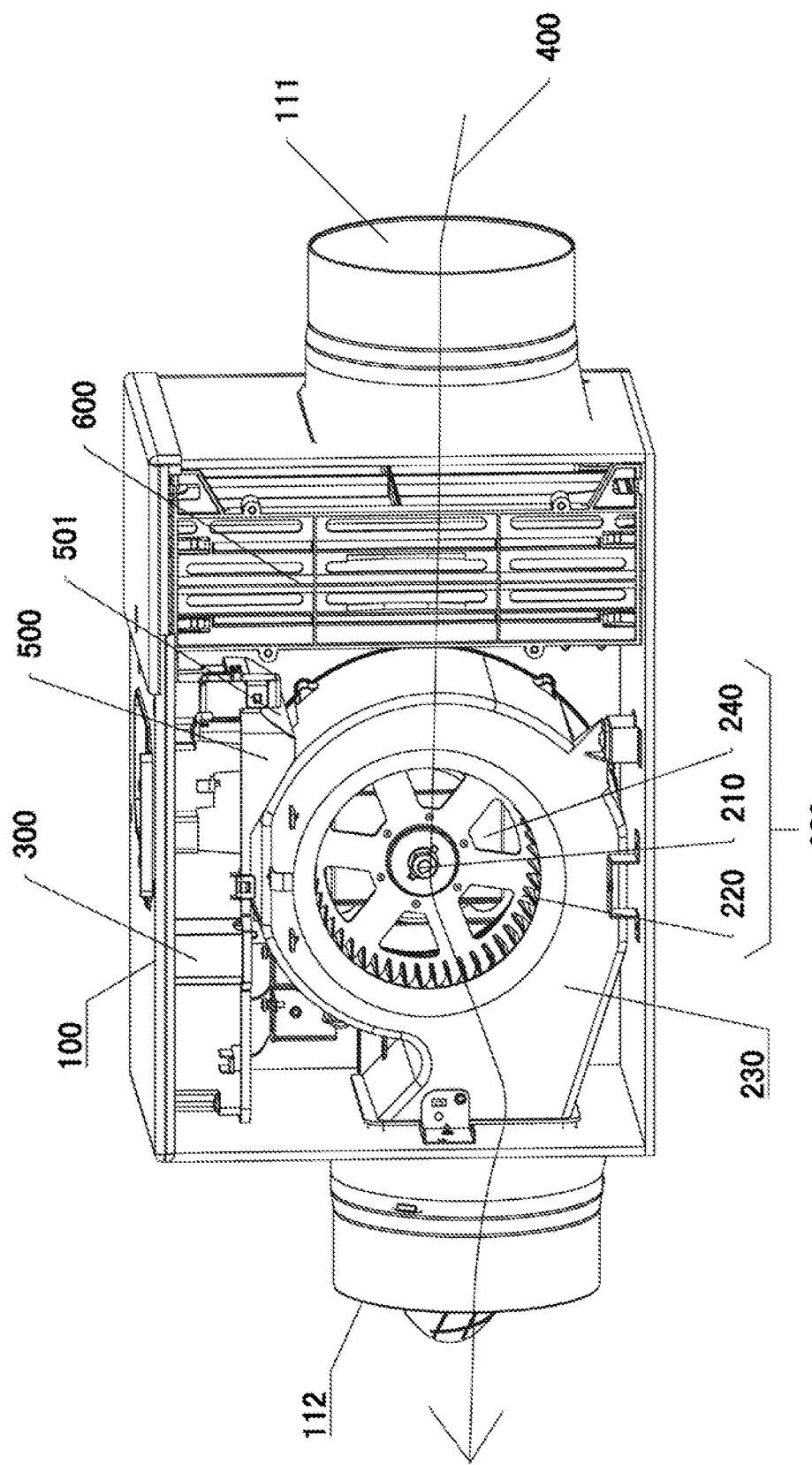
FIG. 2 is a schematic view showing the internal structure of the ventilating device shown in FIG. 1.

In an exemplary embodiment of the present disclosure, a ventilating device is provided. FIG. 1 is an overall schematic view of a ventilating device in accordance with an embodiment of the present disclosure. FIG. 2 is a schematic view showing the internal structure of the ventilating device shown in FIG. 1. As shown in FIG. 1 and FIG. 2, the ventilating device of the present embodiment includes a frame 100, an air blowing unit 200, a circuit board box 300, an air passage 400, a baffle 500, a filtering screen unit 600, and an indicator lamp 700.

Figure 3:
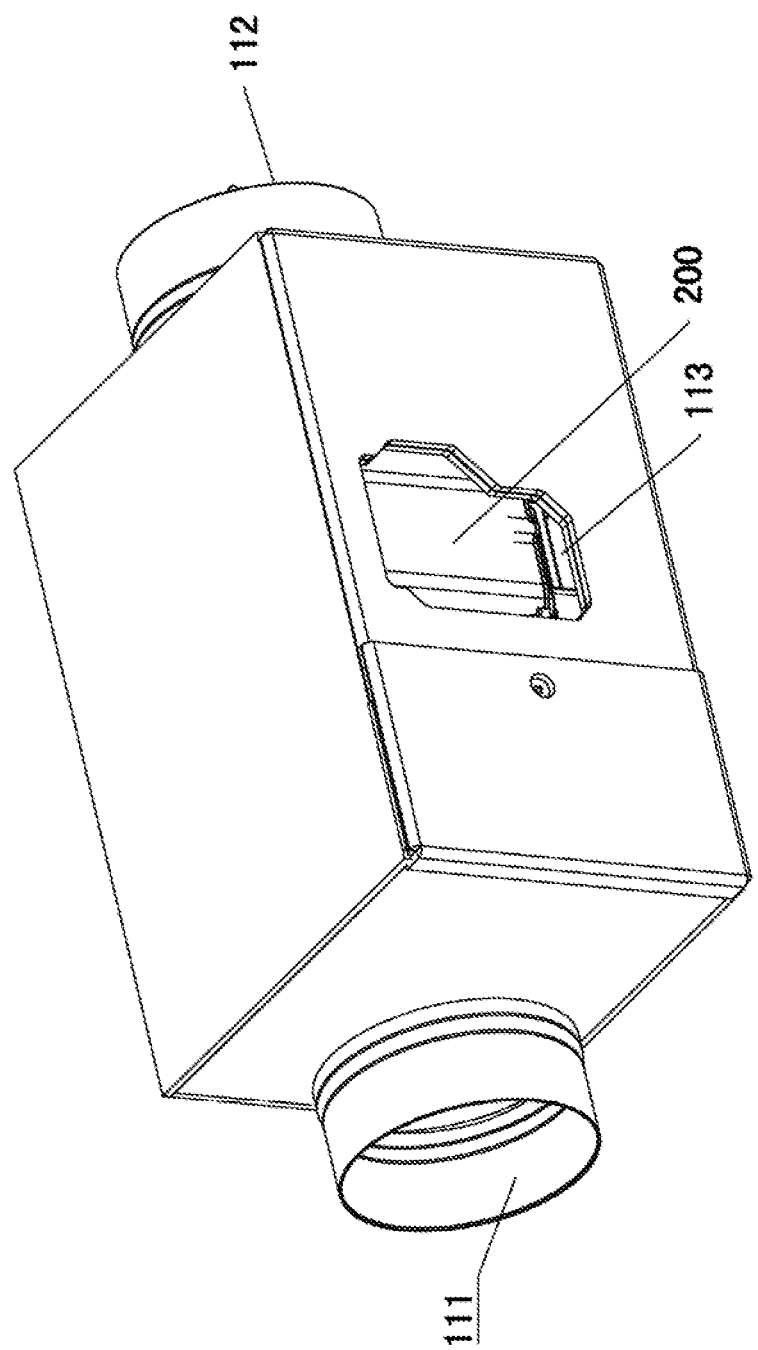
FIG. 3 is a schematic view of the ventilating device of FIG. 1 with a circuit board box removed.

FIG. 3 is a schematic view showing a frame portion of the ventilating device shown in FIG. 1. As shown in FIGS. 1, 2 and 3, the frame 100 has a hollow rectangular parallelepiped shape, and has an air inlet 111 for allowing air to enter the frame and an air outlet 112 for discharging air entering the frame 100 from the frame 100. A second opening 113 is provided in one face of the frame 100.

Continuing referring to FIG. 3, the air inlet 111 is an opening provided for sucking air outside the frame. For example, when the ventilating device is installed on the ceiling, the air inlet 111 is provided on a side face of the ventilating device.

Continuing referring to FIG. 3, the air outlet 112 is an opening provided for blowing air indrawn from the air inlet 111 as exhaust air out of the interior of the frame 100. For example, when the ventilating device is installed on the ceiling, the air outlet 112 is provided on a side of the ventilating device opposite to the side on which the air inlet 111 is provided.

Continuing referring to FIG. 3 and FIG. 1, the second opening 113 has a same shape as a first opening 340 of the circuit board box 300 (which will be described in detail below), and the second opening 113 is larger than the first opening 340. The second opening 113 may expose a panel 330 of the circuit board box to the exterior of the frame 100. That is, a user may access the panel 330 through the second opening 113.

Referring to FIG. 2, the air blowing unit 200 includes a motor 210, a fan blade 220, a casing 230, and an air intake port 240. When the motor 210 is energized, a rotary shaft is driven to rotate. The fan blade 220, such as a multi-flap blade, is coupled to the rotary shaft to cause the generation of air flow by rotation of the rotary shaft of the motor 210. The casing 230 has an outer contour in which the fan blade 220 and the motor 210 are hidden and which, for example, has a volute shape. The air intake port 240 draws air in the frame 100 into an opening of the casing 230.

Figure 4:
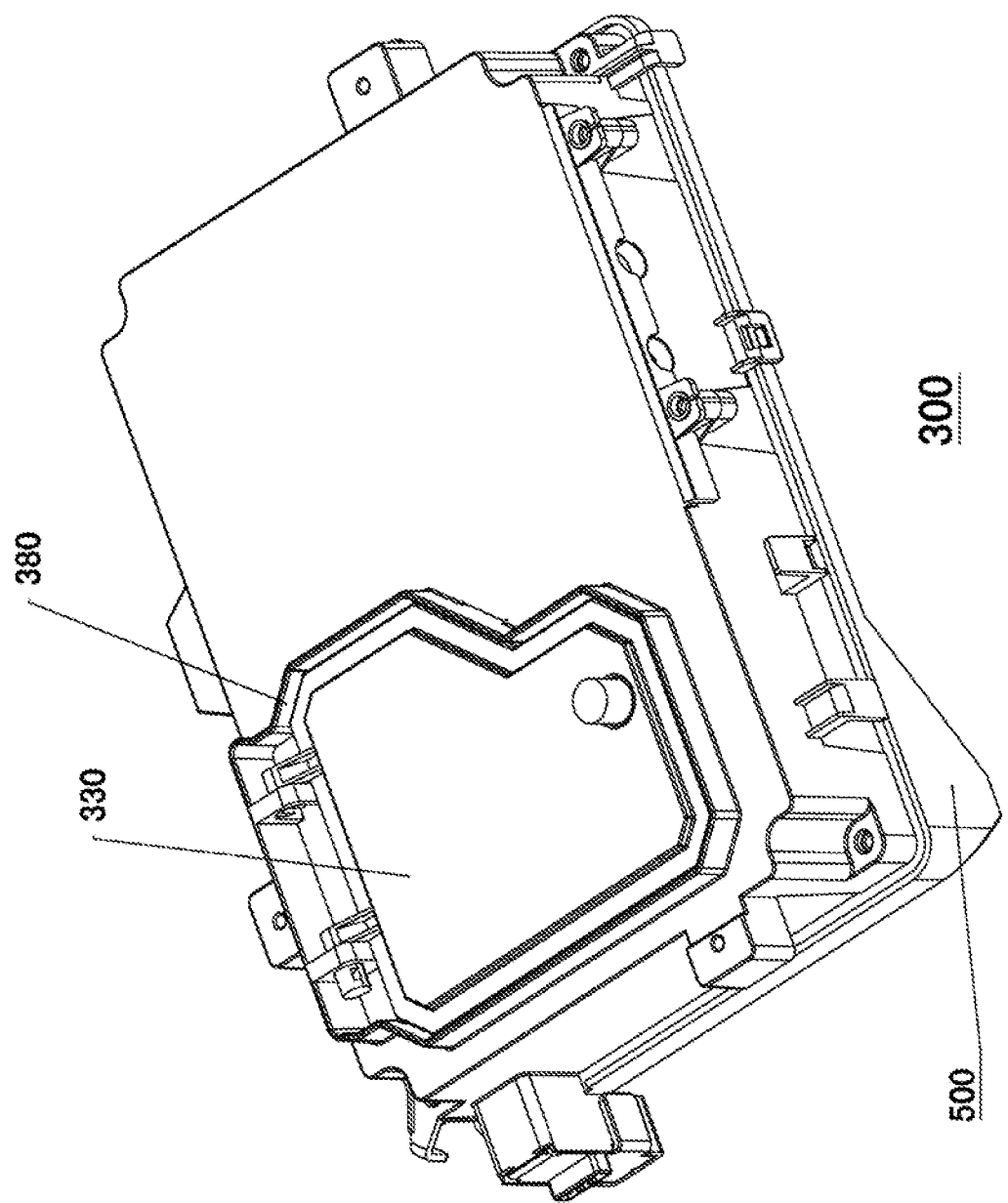
FIG. 4 is a schematic structural view of a circuit board box in the ventilating device shown in FIG. 1.
Figure 5:
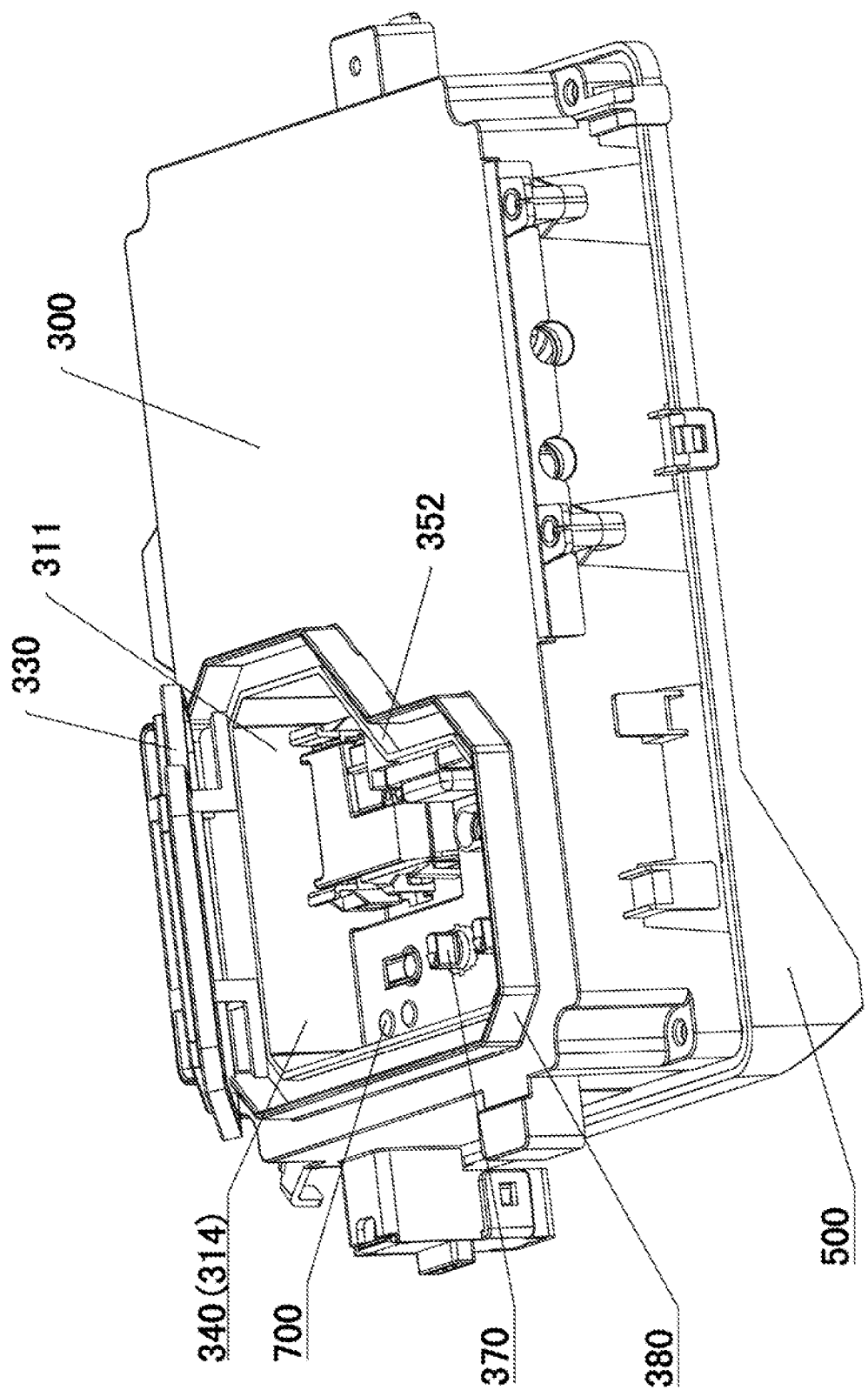
FIG. 5 is a schematic view of the circuit board box in the ventilating device shown in FIG. 1 with a panel opened.
Figure 6:
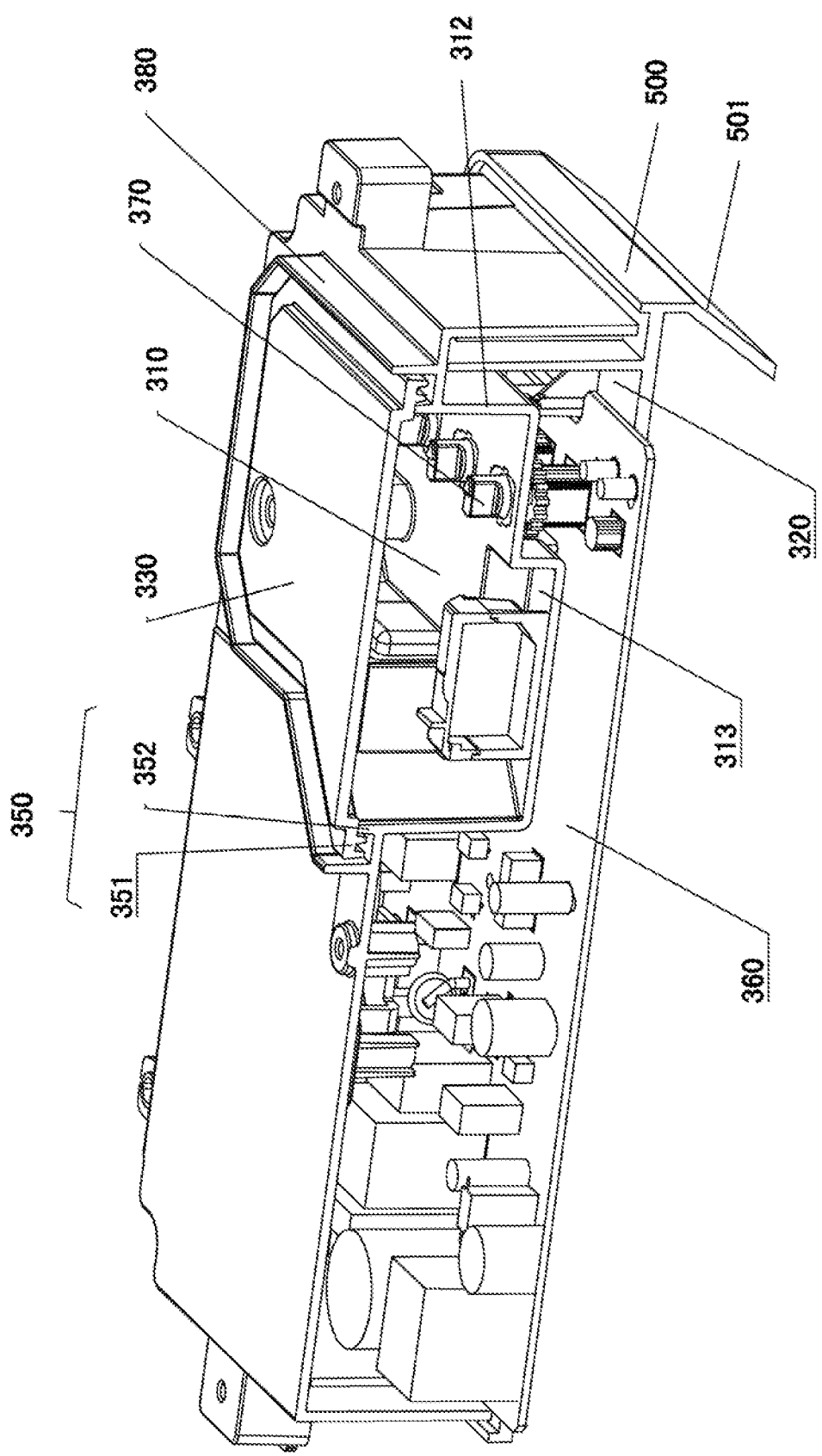
FIG. 6 is a cross-sectional view showing the circuit board box in the ventilating device shown in FIG. 1.

FIG. 4 is a schematic structural view of a circuit board box in the ventilating device shown in FIG. 1. FIG. 5 is a schematic view of the circuit board box in the ventilating device shown in FIG. 1 with the panel opened. FIG. 6 is a cross-sectional view showing the circuit board box in the ventilating device shown in FIG. 1. As shown in FIG. 2, FIG. 4. FIG. 5 and FIG. 6, the circuit board box 300 is disposed in the frame 100 and is adjacent to the outer side of the casing 230. The circuit board box 300 is internally provided with a control circuit board 360, an operation switch 370 for adjusting the rotating speed of the air blowing unit, and the like. The circuit board box 300 includes a first accommodating portion 310, a second accommodating portion 320, a panel 330, a first opening 340, and a sealing portion 350.

The control circuit board 360 is configured to control the operation of the air blowing unit when the control circuit board receives an electrical signal.

The operation switch 370 can change the operation of the control circuit board according to, for example, the change of state of the operation switch, and may be a switch for adjusting the rotating speed of the air blowing unit, a switch for starting or closing the air blowing unit, or a component that can adjust the device or other devices by sending a signal.

The second accommodating portion 320 is a space for accommodating the control circuit board 360, adjacent to the first accommodating portion 310 and surrounding the first accommodating portion 310 without completely surrounding the first accommodating portion 310. A part of the wall of the second accommodating portion 320 is a wall of the circuit board box, and another part of the wall is a wall of the first accommodating portion.

Continuing referring to FIG. 5 and FIG. 6, the first accommodating portion 310 is a space for accommodating the operation switch 370, and includes a first face 311, a second face 312 adjacent to the first face, and a third face 313 opposite to the first face. The second face 312 and the third face 313 of the first accommodating portion are not in contact with the inner wall of the circuit board box. That is, the first accommodating portion protrudes in a direction toward the second accommodating portion 320 from the first opening 340, and the first opening 340 provided in the first face of the first accommodating portion functions as an operation port.

The operation port 314 is the first opening 340 of the circuit board box and is disposed in the first face 311 of the first accommodating portion.

The panel 330 is a cover which is configured for preventing air from entering the first accommodating portion 310 from the first opening 340, and which is fixed to the wall of the circuit board box by a screw and a pin structure and covers the first opening 340. The panel 330 is formed of a transparent material, and the operation switch 370 housed in the first accommodating portion is visible for the user without opening the panel 330.

The first opening 340 is disposed in one face of the circuit board box, and in particular, is an opening in the wall of the circuit board box opposite to the frame. The first opening 340 has a same shape as the second opening 113, but the second opening 113 is larger than the first opening 340. Further, a water directing rib 380, which will be mentioned below, is provided around the first opening 340 and extends outwards in a direction toward the exterior of the circuit board box. The front end of the water directing rib penetrates through the second opening 113 and is flush with the outer peripheral surface of the frame. That is, the second opening 113 may expose the panel 330 of the circuit board box out of the frame. The user can access the operation switch from the exterior of the circuit board box and the exterior of the frame through the first opening 340 and the second opening 113.

As shown in FIG. 3, the water directing rib 380 is disposed on the wall of the circuit board box where the first opening 340 is disposed, and surrounds the entire circumference of the first opening 340. The water directing rib 380 is provided to surround the outer periphery of the panel and the outer periphery of a second rib of the sealing portion 350 (which will be described in detail below) and protrudes beyond the surface of the panel. When the circuit board box is vertically disposed in the ventilating device, that is, when the circuit board box is disposed in the ventilating device in such a manner that the plane in which the first opening 340 is located is a vertical plane, the upper portion of the water directing rib has a curved surface.

As shown in FIG. 6, the sealing portion 350 is disposed around the circumference of the first opening 340. The sealing portion 350 includes a first rib 351 and a second rib 352. In an example, the first rib 351 includes a plurality of annular ribs extending from the periphery of the inner surface of the panel in a direction toward the first accommodating portion 310. The second rib 352 includes an annular rib surrounding the first opening and extending from the circuit board box 300, in particular, from the periphery of the first opening, in a direction toward the panel 330.

When the panel 330 is in a closed state, the first rib 351 and the second rib 352 are positioned to be overlapped in parallel and to extend in a direction perpendicular to a direction of the air entering from a gap between the panel and the wall of the circuit board box, thereby preventing the air from entering from the gap between the panel and the wall of the circuit board box.

The air passage 400 communicates the air inlet 111 with the air outlet 112, and is a space in which the air moves. The air passage 400 is an air passage or path formed by an air passage wall provided around the air passage 400.

As shown in FIGS. 2 and 6, the baffle 500 has a plate-like shape and is provided on the wall of the circuit board box constituting the air passage 400. That is, a face of the circuit board box 300 opposite to the face on which the panel 330 is arranged forms the air passage wall on which the baffle 500 extends. The baffle 500 is provided to suppress the air entering from the air inlet from hitting the wall surface of the circuit board box 300.

An inclined surface 501 directs the air flowing from the air inlet 111 toward the air outlet 112 to the air intake port 240 of the air blowing unit 200 located at a downstream side. That is, the inclined surface 501 is inclined in a direction toward the air intake port of the air blowing unit.

Referring to FIG. 1, the filtering screen unit 600 has a rectangular parallelepiped shape and is disposed at an upstream side of the air blowing unit 200. The filtering screen unit 600 is composed of a filtering screen having one or more filtering effects or a plurality of filtering screens having one or more filtering effects. The filtering screen unit is able to purify the air indrawn from the air inlet and blocks the entry of dust and fine particles.

The indicator lamp 700 is disposed in the first accommodating portion 310 that is visible for the user through the transparent panel, and configured to indicate the state of the filtering screen unit. For example, when the indicator lamp 700 is on or off, it means that the filtering screen of the filtering screen unit 600 needs to be replaced. Further, the control of the indicator lamp 700 is performed, for example, based on a controlling part provided on the control circuit board 360, or the replacement period is determined based on, for example, the total amount of air passing through the air blowing unit 200 or the air passage or the time elapsed from the previous replacement. Then, the total amount can be calculated, for example, by the control circuit board based on the rotating speed of the air blowing unit 200. The total amount calculated by the control circuit board is compared with a predetermined threshold, and when the total amount exceeds the predetermined threshold, the indicator lamp 700 is turned on or off.

The above description relates to the configuration of the ventilating device. The following description will be based on the operation of the ventilating device.

For example, power is supplied to the air blowing unit 200 by operating, by the user, an operation switch of the ventilating device installed in the ceiling or underground. Then the fan blade 220 rotates, generating an air flow that is blown in a direction from the air inlet toward the air outlet. For example, in winter or in an environment where the temperature of the outdoor air is low, the temperature of the air inside the ventilating device, that is, the air passing through the air passage, is low, and the entire ventilating device is cooled. However, since the temperature of the air in the ceiling or underground is higher than the temperature of the outdoor air, the air in the ceiling or underground will also be cooled after coming into contact with the ventilating device, resulting in that dewing is likely to occur on the outer periphery of the ventilating device.

The above dewing will be described in detail hereinafter.

As shown in FIG. 1 and FIG. 6, the indoor hot and humid air is in contact with the panel 330 exposed outside the frame, and then the indoor hot and humid air enters the circuit board box 300 from the gap between the panel and the circuit board box and is brought into contact with the circuit board box 300 cooled by the cold air entering from the air inlet into the frame 100. Thus, the hot and humid air will be cooled, and dew is generated in the circuit board box 300.

Therefore, in the present embodiment, the sealing portion 350 is provided around the first opening 340. The sealing portion 350 includes: an annular first rib 351 extending on the inner surface of the panel in a direction from the panel toward the first accommodating portion, and an annular second rib 352 extending on the wall of the circuit board box provided with the first opening in the direction toward the panel from the first accommodating portion side. In this way, it is difficult for the hot and humid air to enter the circuit board box. In addition, the first rib 351 and the second rib 352 are disposed into a plurality of strips, so that the indoor hot and humid air can be prevented, due to multiple blocking effects by the strips, from entering the circuit board box to improve airtightness and to suppress the occurrence of dew.

Further, since the indoor hot and humid air is prevented from entering the interior of the circuit board box 300 by the arrangement of the sealing portion 350, there is no need for the outer surface of the panel 330 to be attached with a member such as a sponge that hinders heat conduction. Therefore, the first accommodating portion may be provided therein with an indicator lamp 700 for indicating the state of the filtering screen unit, or a liquid crystal display screen (not shown) for displaying the ventilation state of the ventilating device. So the user can intuitively view the interior of the panel without opening the panel. Then the period for exchanging the filtering screen can be identified based on the lighting of the indicator lamp 700 or the like, or the parameters of the ventilating device can be known through the display screen, improving the convenience.

Further, when the moisture in the indoor hot and humid air absorbed by the sponge attached outside the frame is saturated, moisture may ooze out from the sponge. In order to prevent the oozing moisture from flowing to the sealing portion 350, in an embodiment, when the first opening is closed by the panel, the water directing rib 380 surrounding the panel is provided outside the panel, and moisture will flow away along the water directing rib. Moreover, when the circuit board box 300 is vertically installed in the frame 100, that is, when the plane in which the first opening 340 is located is perpendicular to the horizontal plane, the surface located at the upper portion of the water directing rib 380 is provided to be a curved surface, such that when moisture oozes out on an upper portion of the panel 330, the moisture will flow along the curved surface to the two sides of the panel. Moreover, since the water directing rib 380 extends to be higher than the panel 330, water will not drop at the panel 330. In this way, the dewed moisture can be prevented from entering the circuit board box.

As shown in FIG. 6, in an embodiment, the first accommodating portion 310 is formed to protrude from the plane in which the first opening 340 is located in a direction toward the second accommodating portion 320. That is, the second accommodating portion 320 surrounds the first accommodating portion 310, but not completely surrounding the first accommodating portion 310. In addition, the second accommodating portion 320 is formed between the second surface 312 and the inner wall of the circuit board box and between the third surface 313 and the inner wall of the circuit board box. That is, the second accommodating portion 320 separates the second face 312 and the third face 313 from the wall of the circuit board box. Therefore, the cold air entering the frame from the air inlet cannot be in contact with the first accommodating portion 310 that is, the place where there is possibility that the first accommodating portion 310 may be in contact with the cold air is separated by the second accommodating portion 320, so even if the indoor hot and humid air enters the first accommodating portion 310 and dewing occurs, it may only remain in the first accommodating portion 310, protecting a control circuit board with the strong electricity or the like for the second accommodating portion 320 from dewing.

Further, the circuit board box is divided into the second accommodating portion 320 and the first accommodating portion 310 and the control circuit board 360 with strong electricity is housed in the second accommodating portion 320 while the parts with weak electricity such as the operation switch 370 are housed in the first accommodating portion 310. That is to say, the separation of the parts with strong electricity from the parts with weak electricity can prevent the user from coming into contact with the parts with strong electricity. In this way, the user can only access the first accommodating portion 310, thereby improving safety. Further, since the second accommodating portion and the first accommodating portion are separated, the panel can be opened to operate the operation switch in the first accommodating portion even if the ventilating device is still in operation.

As shown in FIG. 2, in addition, the circuit board box 300 constitutes an air passage wall, that is, a wall along which the cold air passes through the circuit board box 300, so that the temperature of the wall of the circuit board box is lowered. Therefore, in order to suppress the formation of dew, a baffle 500 is provided on the wall of the circuit board box, and the baffle is provided with an inclined surface for directing the air flowing from the air inlet 111 to the air outlet 112 to the air intake port of the air blowing unit. Thus, when cold air enters the frame from the air inlet, it will hit the baffle 500, and then is blown along the inclined surface 501 in a direction toward the air intake port of the air blowing unit, thereby preventing the circuit board box from being subject to a direct blowing of cold air, which suppresses the formation of dew.

As shown in FIG. 1 and FIG. 3, for the convenience of operation, in an embodiment, the wall of the frame 100 facing the first opening is provided with a second opening 113 for exposing the panel 330 to the exterior of the frame, and the first opening 340 corresponds to the operation port of the first accommodating portion. That is, when the user wishes to adjust the wind speed, as long as the panel 330 protruding from the frame is opened, the hand of the user can be inserted into the first accommodating portion 310 through the first opening 340 to perform the adjustment of the wind speed, improving the convenience.

It can be seen from the above technical solutions that the ventilating device of the present disclosure has at least one of the following beneficial effects:

(1) A sealing portion is provided around the first opening, and the sealing portion includes: a first rib and a second rib. The first rib is configured to include a plurality of annular ribs extending from a periphery of the inner surface of the panel in a direction toward the first accommodating portion. The second rib is configured to be an annular rib surrounding the first opening and extending on the circuit board box from the periphery of the first opening in a direction toward the panel. When the panel is in the closed state, the first rib and the second rib are positioned to be overlapped in parallel and to extend in a direction perpendicular to a direction of the air entering from a gap between the panel and the wall of the circuit board box, preventing the air from entering from the gap between the panel and the wall of the circuit board box, and thereby suppressing the occurrence of dewing.

(2) The second accommodating portion surrounds the first accommodating portion, but not completely surrounding the first accommodating portion. The second accommodating portion separates the second face and the third face from the wall of the circuit board box. The portions in the first accommodating portion that may be in contact with the cold air are separated by the second accommodating portion, so the cold air entering the frame from the air inlet cannot be in contact with the first accommodating portion. Although there is indoor hot and humid air entering the first accommodating portion to dew, the dew will only stay in the first accommodating portion, and the control circuit board with strong electricity in the second accommodating portion is protected from dewing.

(3) In order to suppress the occurrence of dewing, a baffle is provided on the wall of the circuit board box, and the baffle is provided with an inclined surface that directs air flowing from the air inlet to the air outlet to the air intake port of the air blowing unit. In this way, when cold air enters the frame from the air inlet, it will hit the baffle and then is blown along the inclined surface in a direction toward the air intake port of the air blowing unit, so that the circuit board box can be prevented from being directly blown by the cold air, suppressing the formation of dew.

(4) A wall of the frame opposite to a plane in which the first opening is located is provided with a second opening for exposing the panel to the exterior of the frame, and the first opening corresponds to the operation port of the first accommodating portion. That is, when the user wishes to adjust the wind speed, only by opening the panel protruding out of the frame, the hand of the user can be inserted into the first accommodating portion through the first opening to adjust the wind speed, improving the convenience of operation.

(5) The panel is formed of a transparent material, and the operation switch housed in the first accommodating portion is visible for the user without opening the panel.

(6) The water directing rib extending in a direction toward the exterior of the circuit board box is provided around the first opening. The surface on an upper portion of the water directing rib is configured as a curved surface, so that when moisture oozes out on an upper portion of the panel, the moisture flows along the curved surface toward two sides of the panel. In this way, the dewed moisture may be prevented from entering into the circuit board box.

Heretofore, the embodiments of the present disclosure have been described in detail in conjunction with the accompanying drawings. It should be noted that the implementations that are not shown or described in the drawings or the description are all known to those skilled in the art and are not described in detail. In addition, the above definitions of the various elements and methods are not limited to the specific structure, shape or manner mentioned in the embodiments, and those skilled in the art can simply modify or replace them.

Based on the above description, those skilled in the art should have a clear understanding for the ventilating device of the present disclosure.

In summary, the present disclosure provides a ventilating device that is convenient to operate, can suppress dewing, and has a strong promotion and application value.

It should also be noted that the directional terms mentioned in the embodiments, such as "upper" "lower", "front", "back", "left", "right", etc., only refer to the directions described with respect to the drawings, and it is not intended to limit the protection scope of the present disclosure. Throughout the drawings, the same elements are denoted by the same or similar reference numerals. Conventional structures or configurations will be omitted when it may cause confusion to the understanding of the present disclosure.

Further, the shapes and sizes of the components in the drawings do not reflect the real size and scale, but are merely intended to illustrate the contents of the embodiments of the present disclosure. In addition, any reference signs placed between parentheses in the claims should not be construed as a limitation to the claims.

Further, the word "include", "including", "comprise" or "comprising" does not exclude the presence of the elements or steps that are not recited in the claims. The word "a" or "an" before an element does not exclude the presence of a plurality of such elements.

The ordinal numbers used in the specification and the claims to modify corresponding element, such as "first", "second", "third" and the like, do not means itself an actual sequence of the element, the sequence of one element relative to another element, or the sequence in a manufacturing method. The use of those ordinal numbers is only such that the element with a certain name is definitely distinguishable from another element with an identical name.

Similarly, it should be understood that, in order to simplify the present disclosure and to facilitate the understanding of one or more of the various aspects of the present disclosure, the various features in the present disclosure are sometimes grouped together into a single embodiment, figure, or description thereof in the above description of the exemplary embodiments of the present disclosure. However, the method disclosed should not be construed to reflect the intention that the claimed disclosure requires more features than those specifically recited in the claims. More particularly, as disclosed in the following claims, the disclosed aspects are less than the features in the single embodiments disclosed above. Therefore, the claims following the specific embodiments are hereby explicitly incorporated into the specific embodiments, and each of the claims is itself construed as a separate embodiment of the present disclosure.

The objects, technical solutions and advantageous effects of the disclosure have been further described by specific embodiments described above. It should be understood that the foregoing description merely refers to the specific embodiments of the disclosure and the disclosure is not intended to be limited thereto. Any modifications, equivalent substitutes, improvements, etc., made within the spirit and scope of the present disclosure, are intended to be included within the scope of the present disclosure.

What is claimed is:

1. A ventilating device comprising:
    a frame forming an outer profile of the ventilating device and provided with an air inlet and an air outlet,
    an air blowing unit for directing air from the air inlet to the air outlet;
    a control circuit board for controlling operation of the air blowing unit,
    an operation switch for adjusting a rotating speed of the air blowing unit by means of the control circuit board, and
    a circuit board box for accommodating the control circuit board,
    wherein the circuit board box comprises a first accommodating portion in which the operation switch is housed and a second accommodating portion in which the control circuit board is housed,
    wherein the first accommodating portion comprises a first opening that functions as an operation port for access from exterior of the circuit board box to the operation switch and a panel for covering the first opening,
    wherein the frame is provided with a second opening at a position opposite to the first opening;
    wherein the panel is exposed from the second opening to exterior of the frame, and
    wherein a sealing portion is provided around the first opening,
    wherein the first accommodating portion is integrally connected to the second accommodating portion at the first opening and protrudes in a direction toward the second accommodating portion from a plane in which the first opening is located,
    wherein the first accommodating portion comprises: a first face provided with the operation port, a second face adjacent to the first face, and a third face opposite to the first face;
    wherein the second accommodating portion is formed by the second face, the third face and an inner wall of the circuit board box,
    wherein the inner wall of the circuit board box forms a part of an air passage wall; and
    wherein the first accommodating portion protrudes into the second accommodating portion from the plane and is formed by faces that are not in contact with an inner wall of the second accommodating portion such that the first accommodating portion is substantially located inside the second accommodating portion.

2. The ventilating device according to claim 1, wherein the sealing portion comprises:
    an annular first rib extending from the panel in a direction toward the first accommodating portion and arranged on a periphery of an inner surface of the panel facing the first accommodating portion, and
    an annular second rib arranged on an edge portion of the first opening opposite to the periphery of the panel and extending from the first accommodating portion in a direction toward the panel.

3. The ventilating device according to claim 2, wherein the circuit board box comprises a water directing rib surrounding the panel.

4. The ventilating device according to claim 3, wherein at least one surface of the water directing rib is a curved surface and extends to a position higher than a surface of the panel.

5. The ventilating device according to claim 1,
wherein a plate-like baffle is disposed to extend on the circuit board box and configured to suppress air indrawn from the air inlet from hitting a wall surface of the circuit board box.

6. The ventilating device according to claim 5,
wherein the air blowing unit has an air intake port configured to suck the air indrawn from the air inlet into the air blowing unit, and
wherein the circuit board box constitutes a wall of a part of an air passage communicating the air inlet with the air outlet, the baffle comprising an inclined surface configured to direct the air indrawn from the air inlet to the air blowing unit disposed at a downstream side.

7. The ventilating device according to claim 1,
wherein interior of the first accommodating portion is visible from exterior of the frame through the first opening.

8. The ventilating device according to claim 1,
wherein an indicator lamp is provided in the first accommodating portion and configured to indicate that a filtering screen unit provided at a downstream side of the air inlet is in need of replacement.

9. The ventilating device according to claim 8,
wherein the control circuit board is configured to calculate the rotating speed based on a total amount of the air passing through the air blowing unit, and
wherein the indicator lamp is turned on or off if the total amount exceeds a threshold value.

10. The ventilating device according to claim 7,
wherein an indicator lamp is provided in the first accommodating portion and configured to indicate that a filtering screen unit provided at a downstream side of the air inlet is in need of replacement.

11. The ventilating device according to claim 10,
wherein the control circuit board is configured to calculate the rotating speed based on a total amount of the air passing through the air blowing unit, and
wherein the indicator lamp is turned on or off if the total amount exceeds a threshold value.

12. The ventilating device according to claim 1,
wherein the second accommodating portion does not completely surround the first accommodating portion and separates the second face and the third face from the inner wall of the circuit board box.

* * * * *